United States Patent
Li

(10) Patent No.: US 8,336,480 B2
(45) Date of Patent: Dec. 25, 2012

(54) DYNAMOELECTRIC CONCEALED OBVIOUS WARNING BOARD FOR CAR

(76) Inventor: Zhengwen Li, Shenzhen (CN)

(*) Notice: Subject to any disclaimer, the term of this patent is extended or adjusted under 35 U.S.C. 154(b) by 101 days.

(21) Appl. No.: 12/736,793

(22) PCT Filed: Apr. 29, 2009

(86) PCT No.: PCT/CN2009/071543
§ 371 (c)(1),
(2), (4) Date: Nov. 8, 2010

(87) PCT Pub. No.: WO2009/135420
PCT Pub. Date: Nov. 12, 2009

(65) Prior Publication Data
US 2011/0067620 A1    Mar. 24, 2011

(30) Foreign Application Priority Data

May 7, 2008  (CN) .......................... 2008 1 0066972

(51) Int. Cl.
*B60Q 1/52*  (2006.01)
*B60Q 7/00*  (2006.01)
*G09F 13/16* (2006.01)

(52) U.S. Cl. ........................................ 116/30; 116/28 R

(58) Field of Classification Search ................. 116/28 R, 116/30, 35 R, 51, 52, 53, 54, 63 P, 63 T; 40/589, 40/591, 592, 610, 903; 340/471, 472, 473, 340/480, 482, 483, 484, 485, 487, 488, 489, 340/490
See application file for complete search history.

(56) References Cited

U.S. PATENT DOCUMENTS

| 2,816,377 | A | * | 12/1957 | Hastings | 40/591 |
| 3,734,595 | A | * | 5/1973 | Bendzick | 359/553 |
| 3,777,926 | A | * | 12/1973 | Stieler et al. | 220/849 |
| 3,998,285 | A | * | 12/1976 | Cooper | 280/762 |
| 4,192,161 | A | * | 3/1980 | Borlinghaus | 70/455 |
| 5,041,813 | A | * | 8/1991 | Chang | 340/472 |
| 5,311,412 | A | * | 5/1994 | Yang | 362/541 |
| 5,501,607 | A | * | 3/1996 | Yoshioka et al. | 439/142 |
| 5,566,485 | A | * | 10/1996 | Chang | 40/591 |
| 5,970,639 | A | * | 10/1999 | Hui | 40/610 |
| 2004/0227627 | A1 | * | 11/2004 | Li | 340/464 |

FOREIGN PATENT DOCUMENTS

| DE | 4222010 C1 * | 2/1994 |
| EP | 649775 A1 * | 4/1995 |
| EP | 867338 A2 * | 9/1998 |
| EP | 960776 A2 * | 12/1999 |
| FR | 2930788 A1 * | 11/2009 |

(Continued)

*Primary Examiner* — R. A. Smith
(74) *Attorney, Agent, or Firm* — Raymond Y. Chan; David and Raymond Patent Firm

(57) ABSTRACT

A warning device for mounting on a vehicle having a rear bumper includes a storage housing, a warning frame and a driving unit. The storage housing is concealedly mounted within the rear bumper of the vehicle. The warning frame is selectively received in the storage housing. The driving unit connecting the storage housing and the warning frame to drive the warning frame to operate between a extended mode and a storage mode, wherein in the storage mode, the warning frame is selectively concealed within the storage housing, wherein in the extended mode, the warning frame is selectively driven by the driving unit to extend out of the storage housing to form a triangular structure for providing a warning signal to incoming traffic.

11 Claims, 7 Drawing Sheets

FOREIGN PATENT DOCUMENTS

| | | | |
|---|---|---|---|
| GB | 2207231 A | * | 1/1989 |
| GB | 2275125 A | * | 8/1994 |
| JP | 08048186 A | * | 2/1996 |
| JP | 2002309523 A | * | 10/2002 |

* cited by examiner

DYNAMOELECTRIC CONCEALED OBVIOUS WARNING BOARD FOR CAR

BACKGROUND OF THE PRESENT INVENTION

1. Field of Invention

The present invention relates to a warning sign, and more particularly to a warning device concealedly installed on a vehicle for selectively providing a warning signal to ongoing traffic whenever necessary.

2. Description of Related Arts

Motor vehicles sometimes have problems when they are moving on roads. Very often, problematic vehicles may stop on the road and it is very important for the driver to provide adequate signal to incoming traffic so that other drivers may take precautionary measures to evade the problematic vehicle on the road. When the problematic vehicles stop on highways on which other vehicles are moving at extremely high speed, the provision of adequate warning signals become the key to avoid catastrophic accidents. Conventional warning devices for use in vehicles usually comprise some sorts of triangular supporting frames supporting a reflective surface. The reflective surface is then provided with a warning sign for notifying drivers of incoming traffic to evade the problematic vehicle. These conventional warning devices have a number of disadvantages.

The first disadvantage of conventional warning devices is that the reflective surfaces bearing the warning signals are usually small in size so that drivers of incoming traffic may not notice them.

The second disadvantage of conventional warning devices is that according to traffic regulations of most places, the warning sign must be placed at a predetermined distance from a rear side of the problematic vehicle. For example, the predetermined distance may be 150 m so that the distance between the vehicle and the warning sign is at least 150 m. After the vehicle is fixed, the warning sign must be removed from the road.

This practice imparts great inconvenience to drivers because they need to erect and remove the warning sign at a distance from the vehicle.

The third disadvantage is that since the warning sign must be erected at a distance from the defective vehicle, there must be a substantial time gap between stopping of the defective vehicle and complete erection of the warning sign. This may create danger to the driver of the defective vehicle.

The fourth disadvantage it is very difficult for the warning signs to be used effectively when the weather condition is poor. In other words, since the size of the warning sign is usually small, when the weather condition is poor, drivers of the incoming traffic may not notice the sign.

The fifth disadvantage is that since the warning sign is separately erected at a distance from the vehicle, it may easily be toppled when the warning sign is used in poor weather condition.

SUMMARY OF THE PRESENT INVENTION

The invention is advantageous in that it provides a warning device which is concealedly installed on a vehicle for selectively providing a warning signal to ongoing traffic whenever necessary. In other words, the present invention provides a warning device which is convenient, effective and does not require setting up a warning sign at a distance from the vehicle.

According to the present invention, the foregoing and other objects and advantages are attained by providing a warning device for mounting on a vehicle having a rear bumper, comprising a storage housing, a warning frame, and a driving unit, wherein the storage housing is concealedly mounted within said rear bumper of said vehicle, wherein the warning frame is selectively received in said storage housing, and wherein the driving unit connects said storage housing and said warning frame to drive said warning frame to operate between an extended mode and a storage mode, wherein in said storage mode, said warning frame is selectively concealed within said storage housing, wherein in said extended mode, said warning frame is selectively driven by said driving unit to extend out of said storage housing to form a triangular structure for providing a warning signal to incoming traffic.

The storage housing comprises a housing body and a housing cover movably connected with the housing body through a retention mechanism having a predetermined elasticity.

The warning frame mentioned above comprises first through third frame members wherein the first frame member has an upper end portion pivotally coupled with a corresponding end of the second frame member through a pivot pin to form an inverted "V" shape structure, wherein the third frame member is extended between two lower end portions of the first and the second frame members to form a substantially triangular structure of the warning frame.

The second frame member further has a supporting rib formed thereon for communicating with the third frame member.

The warning frame further comprises an elongated warning member having one end portion pivotally connected with the upper end portion of the second frame member through the pivot pin, wherein another end portion of the elongated warning member is suspendedly extended from the upper end portion of the second frame member.

The elongated warning member is driven to move pivotally through a resilient element to rest substantially vertically so as to form a large exclamation warning signal to incoming traffic.

Thus, the warning sign provided by the present invention is a large exclamation sign for warning incoming traffic.

The warning frame further comprises a plurality of reflective members formed on the first through third frame members and on the elongated warning member.

Moreover, the warning frame further comprises a plurality of illuminating members spacedly formed on the first through third frame members and on the elongated warning member for providing illumination for warning incoming traffic.

The warning frame of the present invention is selectively received in said storage housing, and wherein the driving unit connects said storage housing and said warning frame to drive said warning frame to operate between an extended mode and a storage mode, wherein in said storage mode, said warning frame is selectively concealed within said storage housing, wherein in said extended mode, said warning frame is selectively driven by said driving unit to extend out of said storage housing to form a triangular structure for providing a warning signal to incoming traffic.

The present invention provides a scientific, simple, and a large warning signal for warning incoming traffic in such a manner that the present invention can used in a wide variety of circumstances. Moreover, the present invention provides warning to incoming traffic in a rapid manner so as to avoid the delay mentioned above for conventional warning devices. Furthermore, the warning frame can be compactly received in the rear bumper of the vehicle so as to preserve the normal appearance and size of the vehicle.

DETAILED DESCRIPTION OF THE PREFERRED EMBODIMENT

Referring to FIG. 1 to FIG. 10 of the drawings, a warning device for mounting on a rear bumper of a vehicle according to a preferred embodiment of the present invention is illustrated, in which the warning device comprises a storage housing 1 concealedly mounted within the rear bumper of the vehicle, a warning frame 2 selectively received in the storage housing, and a driving unit 3.

Figure 3:
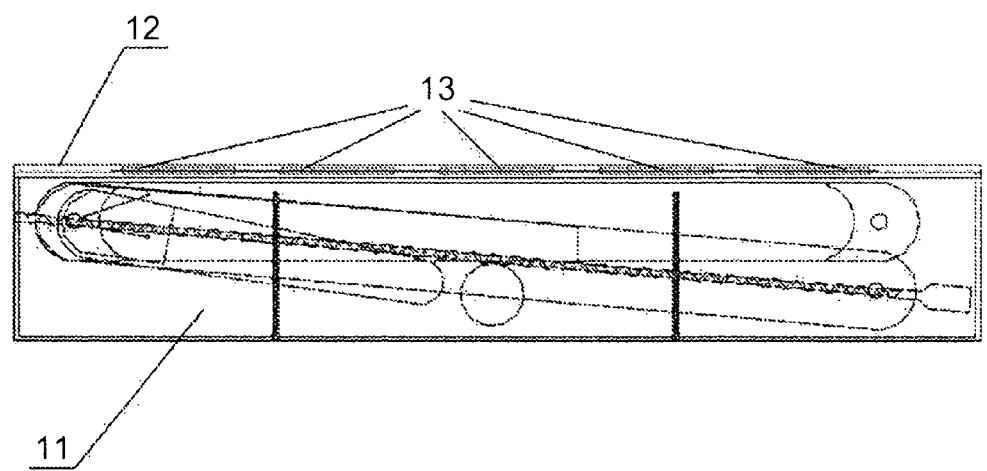
FIG. 3 is a schematic diagram of a warning device according to the above preferred embodiment of the present invention, illustrating that the warning frame is in the storage mode.

The storage housing 1 is illustrated in FIG. 3 of the drawings, in which the storage housing 1 comprises a housing body 11 and a housing cover 12 movably connected with the housing body 11 through a retention mechanism 13 having a predetermined elasticity for normally applying a urging force to close the housing cover 12.

Figure 4:
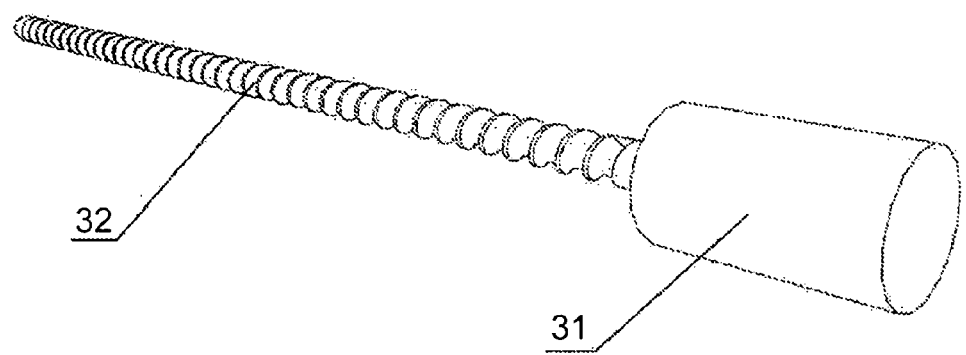
FIG. 4 is a perspective view of a driving unit according to the above preferred embodiment of the present invention.
Figure 5:
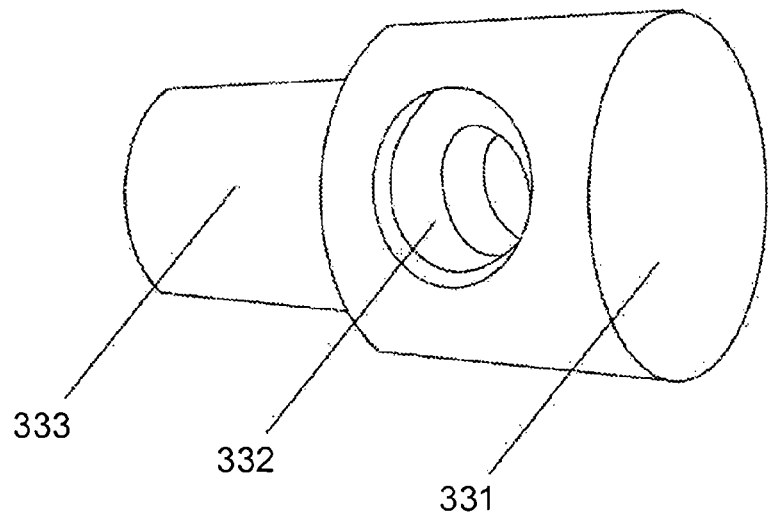
FIG. 5 is a side view of a driving unit according to the above preferred embodiment of the present invention.

The driving unit 3 is illustrated in FIG. 4 and FIG. 5 of the drawings, in which the driving unit 3 comprises a motor 31, a supporting shaft 32 rotatably extended from the motor 31, and a movable piece 33 movably coupled with the supporting shaft 32 in such a manner that the movable piece 33 is capable of moving along an axial direction of the supporting shaft 32 when it is driven to rotate. According to the preferred embodiment of the present invention, the supporting shaft 32 is threaded along its longitudinal direction wherein the movable piece 33 is arranged to displace along the axial direction of the supporting shaft 32 by moving along the threaded supporting shaft 32. On the other hand, the movable piece 33 comprises a main body 331 having a through slot 332 transversely formed thereon, and a connecting shaft 333 arranged to movably connect with a first frame member 21 of the warning frame 2.

Figure 2:
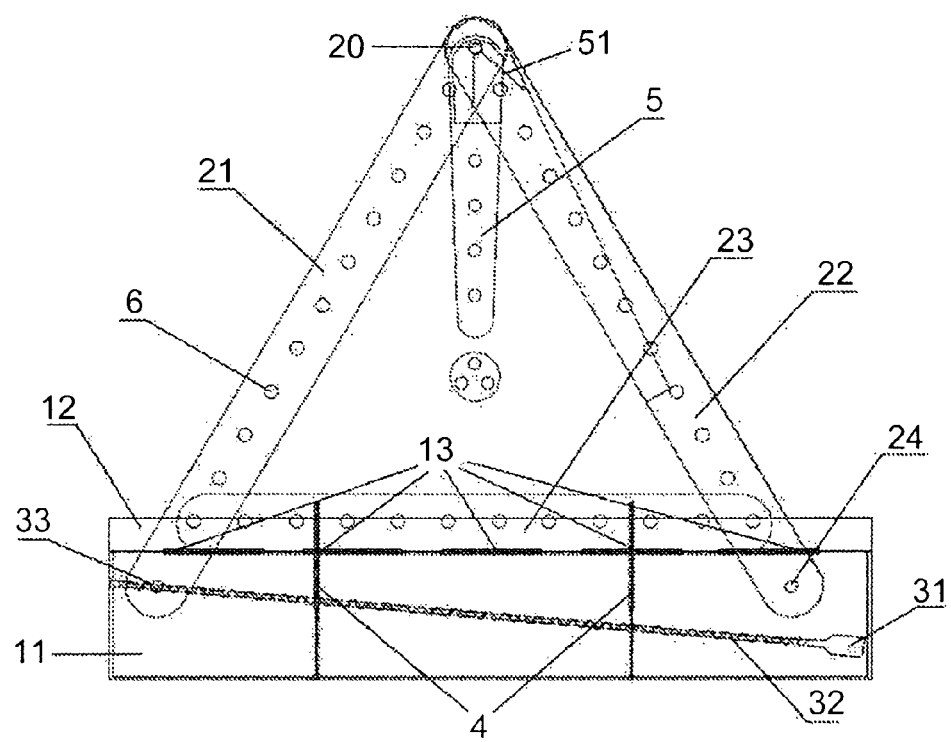
FIG. 2 is a schematic diagram of a warning device according to the above preferred embodiment of the present invention, illustrating that the warning frame is in the extended mode.

The warning frame 2 is illustrated in FIG. 2 of the drawings, and comprises first through third frame members 21, 22, 23 wherein the first frame member 21 has an upper end portion pivotally coupled with a corresponding end of the second frame member 22 through a pivot pin 20 to form an inverted "V" shape structure, wherein the third frame member 23 is extended between two lower end portions of the first and the second frame members 21, 22 to form a substantially triangular structure of the warning frame 2. Moreover, the warning frame 2 further comprises an elongated warning member 5 having one end portion pivotally connected with the upper end portion of the second frame member 22 through the pivot pin 20 (see FIG. 7), wherein another end portion of the elongated warning member 5 is suspendedly extended from the upper end portion of the second frame member 22. The lower end of the second frame member 22 is pivotally coupled with an inner wall of the housing body 11, whereas a lower end of the first frame member 21 is pivotally connected with the movable piece 33 through the connecting shaft 333 in which the movable piece 33 is arranged to displace through an axial direction of the supporting shaft 32. The third frame member 23 is movably supported by the housing body 11 through a plurality of supporting members 4 spacedly provided therein. Furthermore, referring to FIG. 7 of the drawings, the second frame member 22 further has a supporting rib 221 formed thereon for communicating with the third frame member 23.

Figure 6:
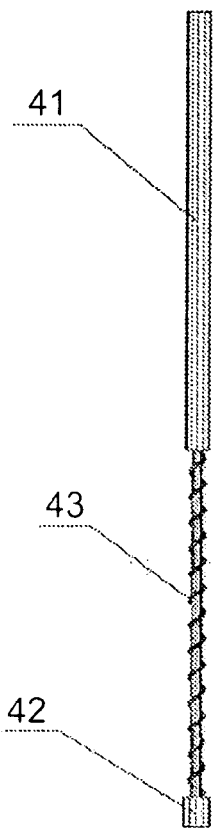
FIG. 6 is a schematic diagram of a supporting member according to the above preferred embodiment of the present invention.
Figure 7:
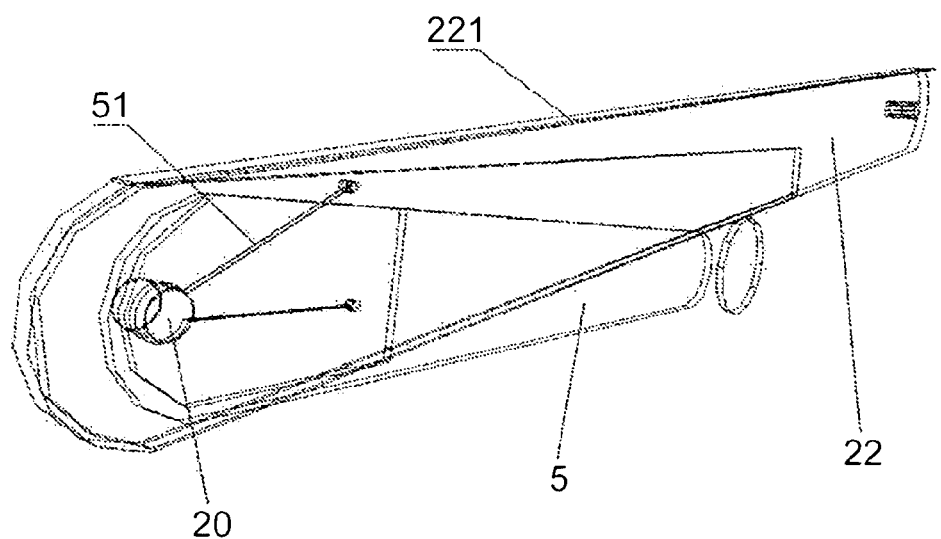
FIG. 7 is a schematic diagram of a warning device according to the above preferred embodiment of the present invention, illustrating the structure of the warning frame.

Referring to FIG. 6 of the drawings, each of the supporting members 4 comprises an elongated tubular member 41 supporting the third frame member 23, a supporting rod 42 movably and partially received in the elongated tubular member 41, and a resilient member 43 mounted on the supporting rod 42 for normally exerting an upward urging force toward the elongated tubular member 41. More specifically, since the third frame member 23 is supported by the elongated tubular member 41 which is subject to the urging force exerted by the resilient member 43, the third frame member 23 is normally forced to move out from the housing body 11. However, when the second frame member 22 is pivotally driven in such a manner that the lower end portion of the second frame member 22 is downwardly and inwardly displaced with respect to the housing body 11, the supporting rib 221 of the second frame member 22 is arranged to be moved to bias against the third frame member 23, which is then capable of resisting the upward urging force exerted by the resilient member 43 and being depressed to move into the housing body 11.

The warning frame 2 further comprises a plurality of reflective members formed on the first through third frame members 21, 22, 23 and on the elongated warning member 5. Moreover, the warning frame 2 further comprises a plurality of illuminating members 6 spacedly formed on the first through third frame members 21, 22, 23 and on the elongated warning member 5.

According to the preferred embodiment of the present invention, the driving unit 3 is arranged to connect the storage housing 1 and the warning frame 2 to drive the warning frame 2 to operate between a extended mode and a storage mode, wherein in the storage mode, the warning frame 2 is selectively concealed within the storage housing 1, wherein in the extended mode, the warning frame 2 is selectively driven by the driving unit 3 to extend out of the storage housing 1 to form a triangular structure for providing a warning signal to incoming traffic. Moreover, when the warning frame 2 operates in the storage mode, the retention mechanism 13 is arranged to exert a force to the housing cover 12 so as to allow the housing cover 12 to selectively cover the housing body 11 (as shown in FIG. 3 of the drawings).

Figure 1:
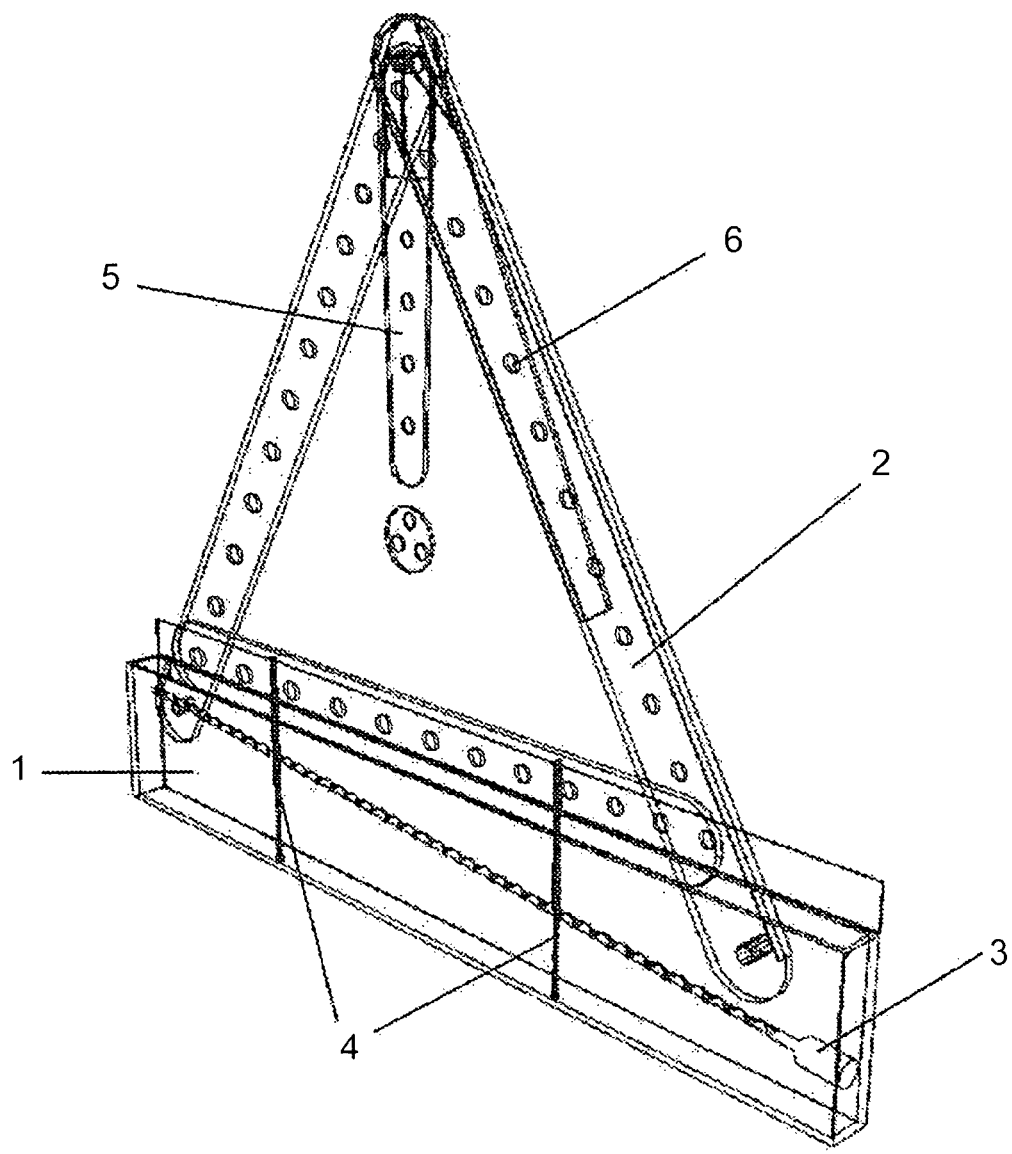
FIG. 1 is a schematic diagram of a warning device according to a preferred embodiment of the present invention.

The operation of the present invention is as follows: when the warning frame 2 is in the extended mode, the motor 31 is activated to drive the supporting shaft 32 to rotate as well. As a result, the movable piece 33 is driven to displace outwardly in an axial direction along the supporting shaft 32. Since the lower end of the first frame member 21 is connected to the connecting shaft 333 of the movable piece, when the movable piece 33 displaces, the lower end of the first frame member 21 is also driven to move as well. When the lower end of the first frame member 21 is driven to displace, the upper end of the first frame member 21 is driven to move upwardly which then drives the upper end of the second frame member 22 to move correspondingly. These movements allow the first and the second frame to form an inverted "V" shape between the first frame member 21 and the second frame member 22, and to separate the third frame member 23 from the supporting rib 221. As a result, the upward urging forces exerted by the resilient members 43 of the supporting members 4 push the third frame member 23 out of the housing body 11 to horizontally expose to the exterior of the storage housing 1. As such, the first through third frame members 21, 22, 23 form a substantially triangular cross section for warning incoming traffic. Furthermore, the elongated warning member 5 is also driven to move pivotally through a V-shaped resilient element 51 to rest substantially vertically so as to form a large exclamation warning signal to incoming traffic (as shown in FIG. 1 and FIG. 2 of the drawings) when the warning frame 2 is in the extended mode.

When the warning frame 2 is in the storage mode, the motor 31 of the driving unit 3 is activated to rotate in an opposite direction to that of the extended mode mentioned above. When the motor 31 is activated, the supporting shaft 32 is driven to rotate which drives the movable piece 33 to displace inwardly along the supporting shaft 32. This movement drives the upper ends of the first and the second frame members 21, 22 to move downwardly and the elongated warning member 5 to overcome the urging force of the resilient element 51 and move toward to overlap with the second frame member 22. At the same time, the second frame member 22 is driven to collapse from the extended mode in such a manner that the supporting rib 221 resumes biasing against third frame member 23, which then depresses the supporting member 4. The result is that the first through third frame member 21, 22, 23 collapse into the storage housing 1, which is selectively covered by the housing cover 12.

Figure 8:
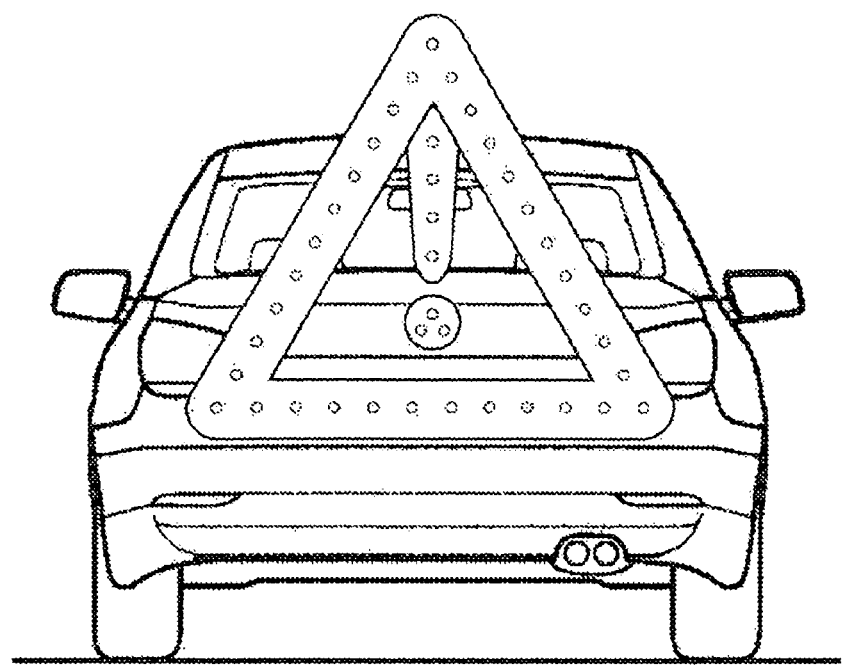
FIG. 8 is a rear view of the warning device installed into a vehicle according to the above preferred embodiment of the present invention.
Figure 9:
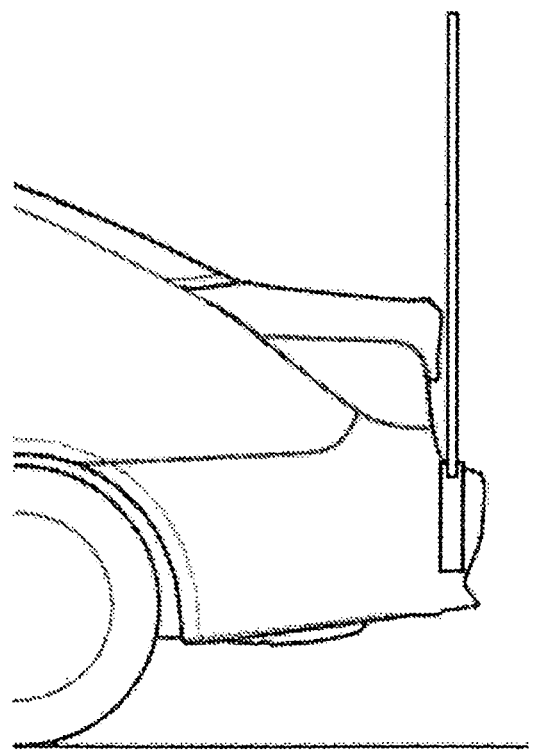
FIG. 9 is a side view of the warning device installed into a vehicle according to the above preferred embodiment of the present invention.

Referring to FIG. 8 to FIG. 9 of the drawings, the warning device of the present invention is preferably mounted in a rear bumper of a vehicle. It is worth mentioning that, in order to widen the range of application of the present invention, the warning device may also be installed onto the vehicle frame of a vehicle. This alternative needs co-operation from car manufacturers.

Figure 10:
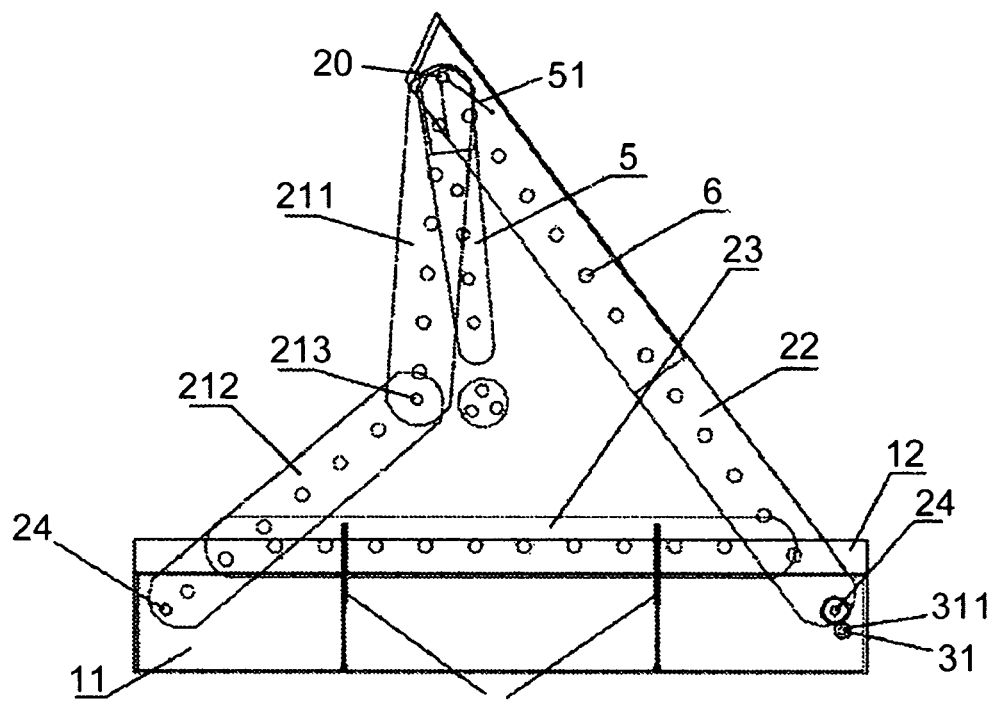
FIG. 10 is a schematic diagram of a warning device according to a second preferred embodiment of the present invention.

Referring to FIG. 10 of the drawings, a warning device according to a second preferred embodiment of the present invention is illustrated. The second preferred embodiment is similar to the first preferred embodiment in that the warning device is normally concealed in the rear bumper of a vehicle, the warning frame 2 forms a triangular cross sectional structure, and operates between the extended mode and the storage mode by the driving unit 3.

The first difference between the first preferred embodiment and the second preferred embodiment is that the first frame member 21 comprises an upper member unit 211 and a lower member unit 212, wherein a lower end of the upper member unit 211 and an upper end of the lower member unit 212 are pivotally connected through a pivot 213.

According to the second preferred embodiment, the upper end of the upper member unit 211 of the first frame member 21 is pivotally connected to the upper end of the second frame member 22. Moreover, the upper and the lower member unit 211, 212 can pivotally move with respect to each other through the pivot 213. On the other hand, the lower end of the lower member unit 212 is pivotally connected with an inner wall of the housing body 11 through a pivot piece 24 so as to form a substantially "V" shape between the lower member unit 212 and the third frame member 23, and between the second frame member 22 and the third frame member 23.

The driving unit 3 according to the second preferred embodiment comprises a motor 31, a driving gear unit 311 provided on the driving shaft of the motor 31, and a driven gear unit 312 provided on the lower end of the second frame member 22, wherein the driving unit 3 is arranged to drive the lower end of the second frame member 22 to pivotally and selectively move in a clockwise direction or in an anti-clockwise direction through the pivot piece 24.

When the warning frame 2 is in the extended mode, the motor 31 of the driving unit 3 is activated to drive, through the driving gear unit 311 and the driven gear unit 312, the lower end of the second frame member 22 to rotate in a clockwise direction. When the second frame member 22 is driven to rotate in the clockwise direction, the upper end of the second frame member 22 is upwardly and pivotally moved so that the upper and the lower member unit 211, 212 will be pivotally move to align with each other.

When the warning frame 2 is in the storage mode, the motor 31 of the driving unit 3 is activated to drive, through the driving gear unit 311 and the driven gear unit 312, the lower end of the second frame member 22 to rotate in an anti-clockwise direction. When the second frame member 22 is driven to rotate in the anti-clockwise direction, the upper end of the second frame member 22 is downwardly and pivotally moved so that the upper and the lower member unit 211, 212 will be pivotally move toward each other for collapsing into the housing body 11, which is closed by the housing cover 12 through the operation of the retention mechanism 13.

Apart from all these, all other components of the warning device in this second preferred embodiment are identical to that described in the first preferred embodiment.

Figure 11:
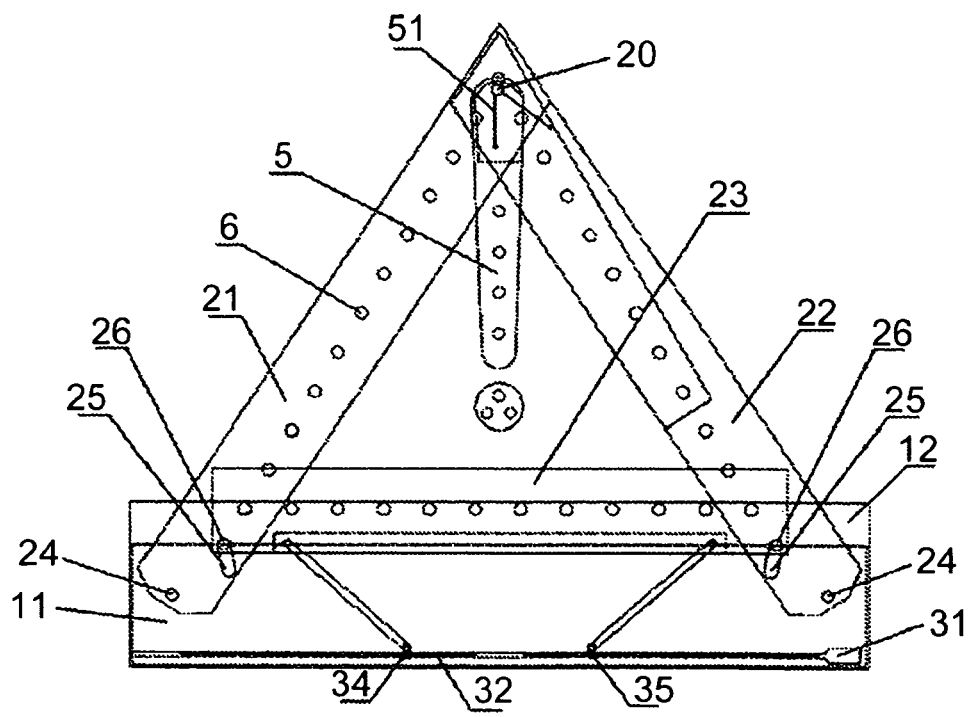
FIG. 11 is a schematic diagram of a warning device according to a third preferred embodiment of the present invention

Referring to FIG. 11 of the drawings, a warning device according to a third preferred embodiment of the present invention is illustrated. The third preferred embodiment is similar to the first preferred embodiment in that the warning device is normally concealed in the rear bumper of a vehicle, the warning frame 2 forms a triangular cross sectional structure, and operates between the extended mode and the storage mode by the driving unit 3.

Figure 12:
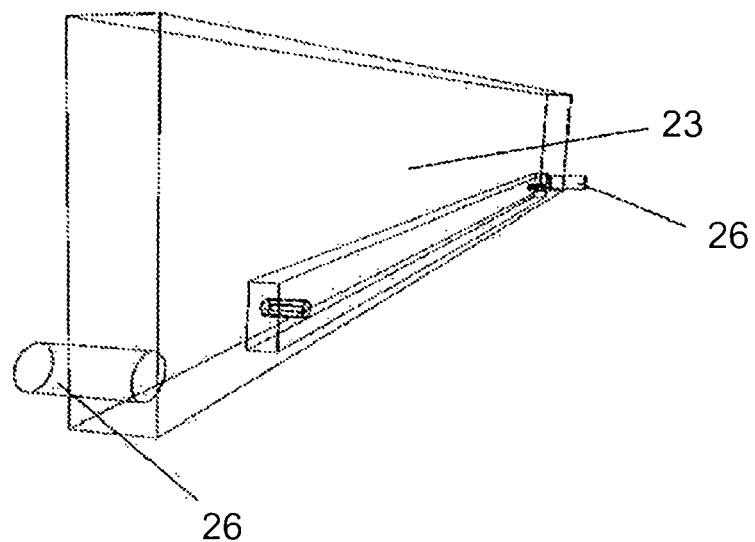
FIG. 12 is a perspective view of the third frame member according to the above third preferred embodiment of the present invention.

The first difference between the third preferred embodiment and the first preferred embodiment is that the upper end of the first frame member 21 is not pivotally connected to the upper end of the second frame member 22. The lower end of the first and the second frame member 21, 22 are pivotally connected with a corresponding inner wall of the housing body 11 via a pivot piece 24. Moreover, each of the first and the second frame member 22 further has a curved slot 25 formed at a lower end portion thereof, wherein the third frame member 23 is extended between the lower end portions of the first and the second frame member 21, 22. The third frame member 23 further comprises a plurality of actuating pins 26 spacedly formed thereon and is extended to slidably insert into the curved slots 25 of the first and the second frame member 21, 22 respectively (see FIG. 12).

Figure 13:
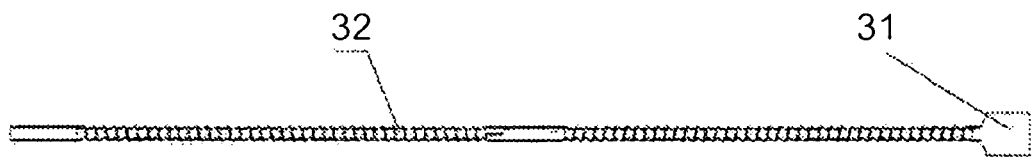
FIG. 13 is a schematic diagram of the driving unit according to the above third preferred embodiment of the present invention.
Figure 14:
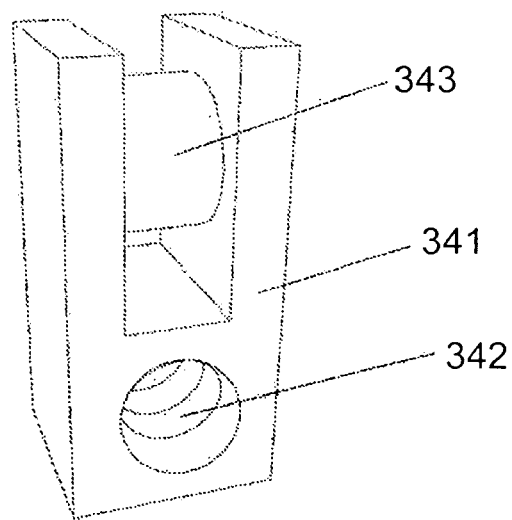
FIG. 14 is a perspective view of a movable piece according to the above third preferred embodiment of the present invention.

As shown in FIG. 13 and FIG. 14 of the drawings, the second difference between the third preferred embodiment and the first preferred embodiment is that the driving unit 3 comprises a motor 31, a supporting shaft 32 rotatably extended from the motor 31, and a plurality of movable pieces 34, 35 movably coupled with the supporting shaft 32. Each of the movable pieces 34, 35 comprises a main body 341, a through slot 342 transversely formed on the main body 341, and a driver shaft 343 provided on the main body 341 for coupling with the corresponding supporting member 4a, 4b. It is worth mentioning that the supporting shaft 32 has a first and a second threaded portion having opposed threading directions, wherein the movable pieces 34, 35 are movably coupled with the first and the second threaded portion respectively. In other words, when the supporting shaft 32 rotates, the movable pieces 34, 35 move in opposed directions.

The third difference between the third preferred embodiment and the first preferred embodiment is that the third frame member 23 further has two ends pivotally connected to two upper ends of the supporting members 4a, 4b via two connecting screws 231, wherein lower ends of the supporting members 4a, 4b are pivotally connected to movable pieces 34, 35 of the driving unit 3 respectively.

When the warning frame 2 is in the extended mode, the motor 31 of the driving unit 3 is activated to drive the supporting shaft 32 to rotate as well. The rotation of the supporting member 32 drives the movable pieces 34, 35 to displace horizontally along the supporting shaft 32 in two opposed directions. In the third preferred embodiment, the first movable piece 34 moves to the left while the second movable piece 35 moves to the right. When the movable pieces 34, 35 move in opposed directions, the movements of the lower ends of each of the supporting members 4a, 4b drive the upper ends of the supporting members 4a, 4b to move upwardly. Hence, the third frame member 23 is driven to move upwardly and expose out of the housing body 11. At the time same, the actuating pins 26 are also driven to move upwardly along the respective curved slots 25 while the first and the second frame members 21, 22 are pivotally and upwardly moved to form a substantially triangular shape with the third frame member 23. The movements of the first through third frame members 21, 22, 23 overcomes the retention force of the housing cover 12 as provided by the retention mechanism 13 and forces the housing cover 12 to open.

When the warning frame 2 is in the storage mode, the motor 31 is activated to rotate in a direction opposed to the extended mode above. The movable pieces 34, 35 are then driven to move in directions opposite to the directions mentioned above (directions bringing the warning frame 2 to move to the extended mode). The result is that the first through third frame members 21, 22, 23 are driven to move downwardly for receiving into the housing body 11. The housing cover 12 will then be closed by the urging force exerted by the retention mechanism 13.

It is worth mentioning that all other components of the warning device according to the third preferred embodiment are identical to what have been disclosed in the first preferred embodiment.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A warning device for mounting on a vehicle having a rear bumper, comprising: a storage housing concealedly mounted within said rear bumper of said vehicle; a warning frame selectively received in said storage housing; and a driving unit connecting said storage housing and said warning frame to drive said warning frame to operate between a extended mode and a storage mode, wherein in said storage mode, said warning frame is selectively concealed within said storage housing, wherein in said extended mode, said warning frame is selectively driven by said driving unit to extend out of said storage housing to form a triangular structure for providing a warning signal to incoming traffic, wherein said storage housing comprises a housing body and a housing cover movably connected with said housing body through a retention mechanism having a predetermined elasticity for normally applying an urging force to close said housing cover, wherein said warning frame comprises first through third frame members, wherein said first frame member has an upper end portion pivotally coupled with a corresponding end portion of said second frame member through a pivot pin to form an inverted "V" shape structure, wherein said third frame member is extended between two lower end portions of said first and said second frame members to form a substantially triangular structure of said warning frame, wherein said second frame member further has a supporting rib formed thereon for communicating with said third frame member when said warning frame is in said storage mode.

2. The warning device, as recited in claim 1, wherein said warning frame further comprises an elongated warning member having one end portion pivotally connected with said upper end portion of said second frame member, wherein another end portion of said elongated warning member is suspendedly extended from said upper end portion of said second frame member.

3. The warning device, as recited in claim 2, wherein said warning frame further comprises a V-shaped resilient element, wherein said elongated warning member is arranged to be driven to move pivotally through a resilient element to rest substantially vertically when said warning frame is in said extended mode.

4. The warning device, as recited in claim 3, wherein said elongated warning member is vertically extended from said second frame member to form an exclamation sign for warning incoming traffic.

5. The warning device, as recited in claim 4, wherein said warning frame further comprises a plurality of reflective members formed on said first through third frame members and on said elongated warning member.

6. The warning device, as recited in claim 5, wherein said warning frame further comprises a plurality of illuminating members spacedly formed on said first through third frame members and on said elongated warning member.

7. The warning device, as recited in claim 6, wherein said warning frame further comprises a plurality of supporting members spacedly provided in said storage housing, wherein each of said supporting members comprises an elongated tubular member supporting said third frame member, a supporting rod movably and partially received in said elongated tubular member, and a resilient member mounted on said supporting rod for normally exerting an upward urging force toward said elongated tubular member.

8. The warning device, as recited in claim 7, wherein warning frame further comprises a pivot pin, wherein said first and said second frame member are extended to form an inverted "V" shaped structure via said pivot pin.

9. The warning device, as recited in claim 8, wherein said driving unit comprises a motor, a supporting shaft rotatably extended from the motor, and a movable piece movably coupled with said supporting shaft in such a manner that said movable piece is capable of moving along an axial direction of said supporting shaft when said supporting shaft is driven to rotate, wherein said supporting shaft is threaded along its longitudinal direction so that said movable piece is arranged to displace along said axial direction of said supporting shaft by moving along said threaded supporting shaft, wherein said movable piece is connected with said lower end portion of said first frame member.

10. The warning device, as recited in claim 7, wherein said first frame member comprises an upper member unit and a lower member unit, wherein a lower end of said upper member unit and an upper end of said lower member unit are pivotally connected through a pivot.

11. The warning device, as recited in claim 10, wherein said driving unit comprises a motor, a driving gear unit provided on said motor, and a driven gear unit provided on said lower end of said second frame member, wherein said driving unit is arranged to drive said lower end of said second frame member to pivotally and selectively move in one of a clockwise direction and an anti-clockwise direction through a pivot piece.

* * * * *